United States Patent
Chen

(10) Patent No.: US 8,122,518 B2
(45) Date of Patent: Feb. 21, 2012

(54) SECURE INPUT METHOD BASED ON VIRTUAL MACHINE

(75) Inventor: Jun Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1095 days.

(21) Appl. No.: 11/749,865

(22) Filed: May 17, 2007

(65) Prior Publication Data

US 2008/0005320 A1    Jan. 3, 2008

(30) Foreign Application Priority Data

May 17, 2006   (CN) .......................... 2006 1 0082547

(51) Int. Cl.
*G06F 21/00* (2006.01)
(52) U.S. Cl. ............................. 726/30; 726/26; 726/27
(58) Field of Classification Search ................... 726/15, 726/30, 26, 27
See application file for complete search history.

(56) References Cited

U.S. PATENT DOCUMENTS

| | | | | |
|---|---|---|---|---|
| 4,887,202 A * | 12/1989 | Tanaka et al. | .................. | 703/21 |
| 6,901,429 B2 * | 5/2005 | Dowling | ....................... | 709/203 |
| 6,990,663 B1 * | 1/2006 | Arndt | ................................ | 718/1 |
| 7,209,946 B2 * | 4/2007 | Dowling | ....................... | 709/203 |
| 7,284,278 B2 * | 10/2007 | Anson et al. | ..................... | 726/34 |
| 2001/0037450 A1 * | 11/2001 | Metlitski et al. | .............. | 713/152 |
| 2004/0093452 A1 * | 5/2004 | Easton et al. | .................. | 710/305 |
| 2004/0139437 A1 * | 7/2004 | Arndt | ............................. | 718/100 |
| 2004/0177264 A1 * | 9/2004 | Anson et al. | .................. | 713/200 |
| 2004/0267866 A1 * | 12/2004 | Carollo et al. | ................. | 709/200 |
| 2004/0268135 A1 * | 12/2004 | Zimmer et al. | ............... | 713/189 |
| 2005/0091661 A1 * | 4/2005 | Kurien et al. | .................. | 719/310 |
| 2005/0159173 A1 * | 7/2005 | Dowling | .................... | 455/456.3 |
| 2005/0251867 A1 * | 11/2005 | Sastry et al. | ..................... | 726/34 |
| 2005/0257048 A1 * | 11/2005 | Willman | ........................ | 713/165 |
| 2006/0271752 A1 * | 11/2006 | Cowan et al. | ................. | 711/163 |
| 2007/0022427 A1 * | 1/2007 | Arndt | ............................. | 718/104 |
| 2007/0113227 A1 * | 5/2007 | Oney et al. | ........................ | 718/1 |
| 2007/0153715 A1 * | 7/2007 | Covington et al. | ........... | 370/315 |

* cited by examiner

*Primary Examiner* — Edan Orgad
*Assistant Examiner* — Bradley Holder
(74) *Attorney, Agent, or Firm* — Dickstein Shapiro LLP

(57) ABSTRACT

The present invention provides a secure input method based on a virtual machine, in which an application invokes directly a secure input interface provided by a virtual machine monitor and transfers the address and length of input buffer area of the application as input parameters when it requires a secure input, and the virtual machine monitor receives keyboard input information, converts it into a key value and saves the converted key value directly into the input buffer area for the application. This prevents another application from using different filtering drivers and keyboard hooks to acquire the user input and thus enhances the security for a user input.

8 Claims, 2 Drawing Sheets

SECURE INPUT METHOD BASED ON VIRTUAL MACHINE

BACKGROUND OF THE INVENTION

1. Field of Invention

The present invention relates to a virtual machine technology, in particular, to a secure input method based on a virtual machine.

2. Description of Prior Art

In a computer system, when a user inputs data by the keyboard, the device driving program for the keyboard converts the key-pressing event to a corresponding key value and saves it in a buffer memory for inner kernel, then the key value waits until a keyboard hook acquires and stores it into an application reception buffer area. Meanwhile, the computer system generally allows a keyboard filtering driver to intercept the keyboard input event after the keyboard driving, performs special conversion or processing on the keyboard input event and then saves the converted key value in the buffer memory for inner kernel. The computer system allows only one application to obtain the keyboard input focus each time.

During the above flow of a user program receiving a keyboard input, that is, keyboard input->keyboard driver->keyboard filtering driver->buffer memory for inner kernel->keyboard hook->application reception buffer area, since there lacks protective measure for output of the keyboard driver and content in the buffer memory for inner kernel, the data inputted from the keyboard is likely to be acquired by keyboard filtering drivers and keyboard hook of any other computer invasion program. Various Trojan horse programs and eavesdropping programs utilize different filtering driver and keyboard hooks to obtain a user input so as to acquire sensitive data, for example, password, inputted by the user.

On a virtual machine, a keyboard input is first obtained by a virtual machine monitor (VMM), then a keyboard hardware event is sent to a client-end OS through a simulated keyboard device. Like a standard OS, the client-end OS provides the keyboard input to an application through the same flow of keyboard driver->keyboard filtering driver->buffer memory for inner kernel->keyboard hook->application reception buffer area, during which various Trojan horse programs and eavesdropping programs can also utilize filtering driver and different hooks to obtain the user input.

As can be seen from the above introduction, there exists serious security bugs in the keyboard input mechanism for the existing virtual machine, and user input lacks sufficient protection.

SUMMARY OF THE INVENTION

The object of the present invention is to provide an input method based on a virtual machine which can overcome the drawback in the existing input method that another application utilizes different filtering driver and keyboard hooks to acquire the user input and offer a secure input method for the user.

The present invention provides a secure input method based on a virtual machine, which comprises steps of an application invokes a secure input interface of a virtual machine monitor and transfers a logic address and length of input buffer area of the application;

the virtual machine monitor accepts the secure input invoking, turns on an secure input switch and converts the logic address of the input buffer area into a physical address;

the virtual machine monitor receives an output from a keyboard driver, converts it into a key value and saves the converted key value in the input buffer area;

the virtual machine monitor judges that the secure input is completed, returns an input result to the application and turns off the secure input switch.

Further, the virtual machine monitor can be caused to reject input focus switching while the secure input switch is turned on.

From the above method, it can be understood that the input method based on a virtual machine of the present invention settles the output of a keyboard driver directly into an input buffer area provided by an application. This prevents another application from using different filtering drivers and keyboard hooks to acquire the user input and thus enhances the security for a user input.

DETAILED DESCRIPTION OF PREFERRED EMBODIMENTS

Figure 1:
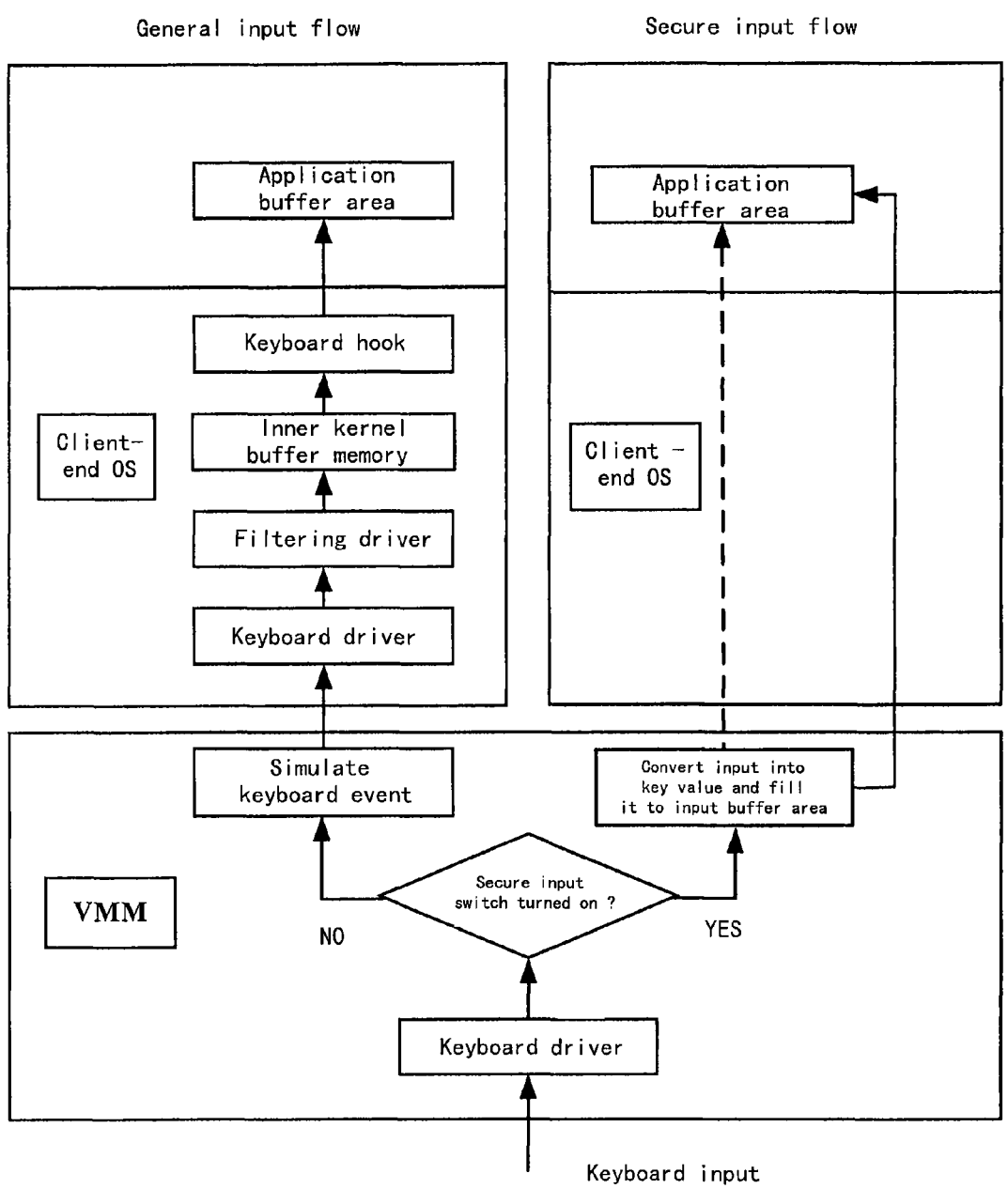
FIG. 1 shows different input flowcharts for a virtual machine monitor.

As shown in FIG. 1, according to the present invention, a virtual machine monitor maintains one secure input switch and provides one secure input interface, and an application can turn on the secure input switch by invoking the secure input interface. When the secure input switch is off, the flow of a keyboard input is the same as that in the existing technology, and when the secure input switch is on, the keyboard input is realized through the secure input flow according to the present invention. In the latter case, the virtual machine monitor will not simulate a keyboard hardware event for a client end, and will instead convert the output of a keyboard driver into an inputted character directly, save it in an input buffer area for the application, and return the saved character to the application upon the completion of the input operation.

Figure 2:
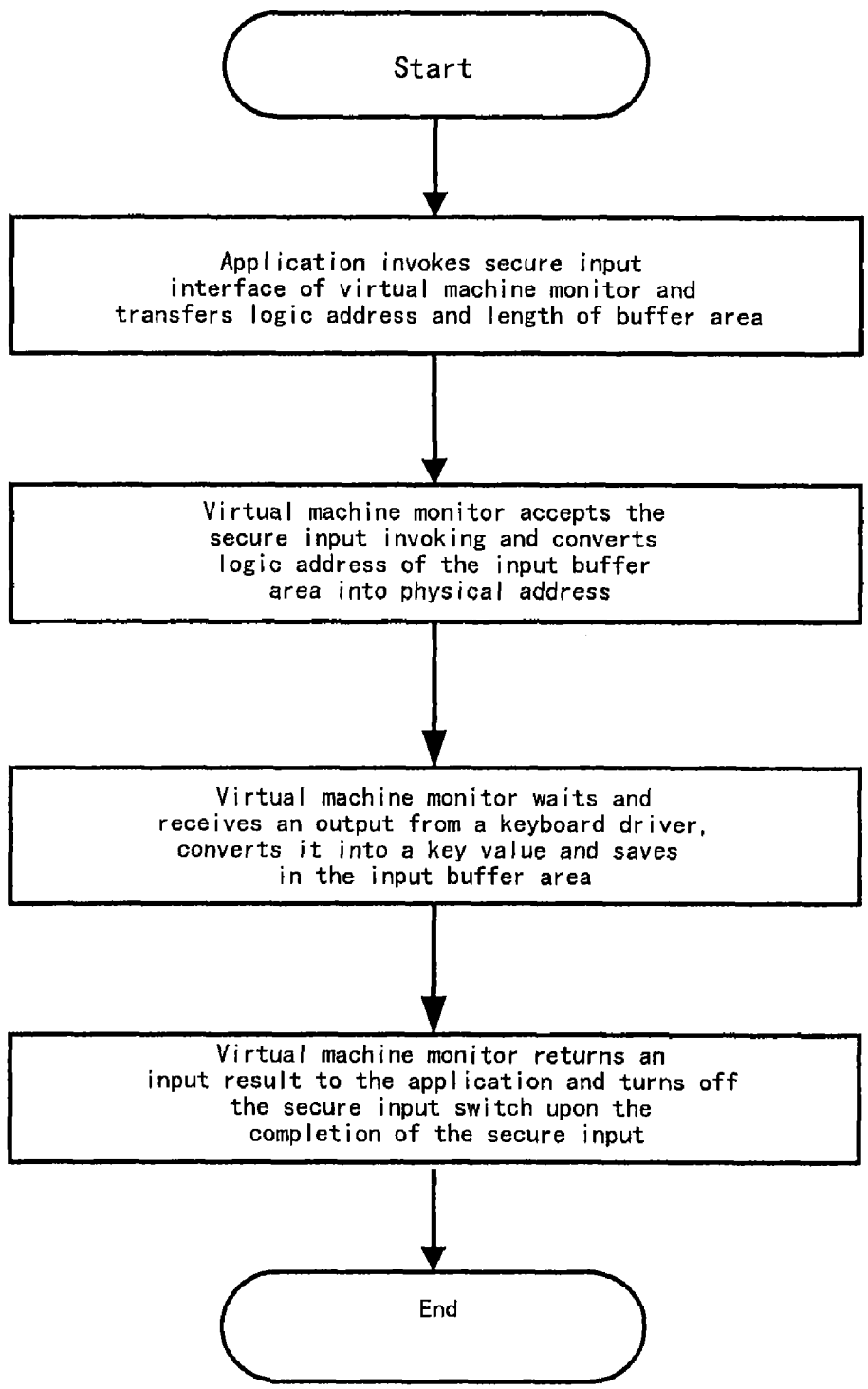
FIG. 2 shows a secure input flow based on a virtual machine according to the present invention.

The specific flow for realizing the secure input of the present invention is as shown in FIG. 2 and comprises the following steps.

Step A1: an application invokes a secure input interface of a virtual machine monitor.

When requiring a secure input, the application invokes initiatively the secure input interface of the virtual machine monitor and transfers the handle of the application as well as the address and length of a buffer area of the application for receiving the input to the secure input interface as parameters. At this moment, the address of the input buffer area is a logic address within the application.

Step A2: the virtual machine monitor accepts the secure input invoking and converts the logic address of the input buffer area into corresponding physical address.

After accepting the invoking on the secure input interface from the application, the virtual machine monitor turns on a secure input switch, stops simulating the keyboard input for a client-end operating system, converts the logic address of the input buffer area, which is transferred as a parameter, into a physical address, and then waits for a user input.

Step A3: the virtual machine monitor waits for and receives the output of the keyboard driver, and then converts the output of the keyboard driver into a key value and saves it in the input buffer area for the application.

If the virtual machine monitor is in a secure input state, after receiving the output of the keyboard driver, it converts it into a key value and then saves the key value in the input buffer area for the application according to the physical address of the input buffer area. In addition, the virtual machine monitor needs to maintain the current input position of the input buffer area so that the input can be properly settled in the input buffer area.

Step A4: the virtual machine monitor returns an input result to the application and turns off the secure input switch when the secure input is completed.

The completion of input operation can be determined by judging whether the length of the inputted content has been equal to the length of the input buffer area, or by detecting whether a certain key, such as an "Enter" key, has been pressed. If it is determined that the length of the inputted content has been equal to the length of the input buffer area, or that certain key has been pressed, the secure input is completed, the virtual machine monitor returns the input result to the application and turns off the secure input switch. If information related to this secure input is also maintained, corresponding resource will be released.

When the virtual machine is in a secure input state, it is possible that another application requires for the input focus. In view of this issue, the present invention proposes various solutions, and the detailed explanation is as follows.

The first method: when the virtual machine is in a secure input state, requirement for the input focus from another application is denied until the secure input for the original application is completed and the secure input switch is turned off. In this case, if the secure input switch has been turned on, any other application will fail to invoke the secure input interface, and further any general requirement for input focus will be denied.

The second method: when the virtual machine is in a secure input state, the request for the input focus from other application is allowed. Upon the input focus being switched to the other application, the virtual machine monitor saves the secure input status for the application which loses the input focus. The secure input status includes the handle, address and length of input buffer area and the current input position for the application, and turns off the secure input switch. When the input focus is switched to the application which loses the input focus again, the virtual machine monitor first checks whether the secure input status corresponding to the handle of the application has been saved, and if saved, turns on the secure input switch again and stores the input at the current position of the input buffer area. Corresponding resource is released upon the completion of the secure input.

The third method: while invoking the secure input interface, the application introduces a parameter as to whether permits the input focus to be switched. Depending on the value of the parameter, the virtual machine monitor responds to the requirement for switching the input focus by employing either the first method or the second method.

From the above steps, it can be understood that the input method of the present invention converts the output of the key driver to a key vale and stores it into an input buffer area provided by the application. This can prevent another application from using different filtering drivers and keyboard hooks to acquire the user input and thus provide a secure input method for the user.

The above description is only the preferred embodiment of the present invention, and the scope of the invention is not limited thereto. In the technology range disclosed in the present invention, any variation or substitution readily conceivable by those skilled in the art should be covered by the scope of the invention, which should be defined by the appended claims.

What is claimed is:

1. A secure input method based on a virtual machine in which a virtual machine monitor controls a secure input switch and provides a secure input interface, the method comprising:

determining whether an application requires a secure input;

if the application requires a secure input, the virtual machine monitor places keyboard input directly into an input buffer area for the application by the following steps:

Step A: the application invokes the secure input interface of the virtual machine monitor and transfers a logic address of input buffer area of the application;

Step B: the virtual machine monitor, after accepting the invoking of the secure input interface by the application, turns on the secure input switch and converts the logic address of the input buffer area into a physical address;

Step C: the virtual machine monitor receives keyboard input information, converts it into a key value and saves the converted key value in the input buffer area; and Step D: the virtual machine monitor judges that the secure input is completed, returns an input result to the application and turns off the secure input switch;

if the application does not require a secure input, the virtual machine monitor does not turn on the secure input switch, and keyboard input is provided to an input buffer area for the application in a conventional manner in which the keyboard input is passed from keyboard driver along a sequence of keyboard driver, keyboard filtering driver, inner kernel buffer memory and keyboard hook and then placed into the input buffer area for the application;

wherein in Step A, the application also transfers the length of the input buffer area of the application, and the virtual machine monitor judges that the secure input is completed when the length of the inputted key value equals to that of the input buffer area or when a key representing the completion is pressed;

wherein the virtual machine monitor denies to switch an input focus when the secure input switch is on.

2. The secure input method of claim 1, wherein the parameter transferred to the secure input interface in Step A further includes identification information of the application.

3. The secure input method of claim 2, wherein said identification information of the application is a handle of the application.

4. The secure input method of claim 2, wherein the virtual machine monitor permits the input focus to be switched when the secure input switch is on, and when switching the input focus, the secure input method further comprises:

Step 6a: the virtual machine monitor turns off the secure input switch and saves the identification information, the address and current input position of the input buffer of the application which loses the input focus.

5. The secure input method of claim 4, wherein while switching the input focus, the virtual machine monitor further executes Step 7a: judging whether identification information for an application, which has obtained the input focus, has been saved, and if saved, turning on the secure input switch and settles received input at the current input position in the input buffer area for the application.

6. The secure input method of claim 2, wherein the parameter transferred to the secure input interface in Step A further includes a flag indicating whether to permit the input focus to be switched.

7. The secure input method of claim 6, wherein if receiving a requirement for switching the input focus when the secure input switch is on, the virtual machine monitor executes Step 9a: checking whether the secure input permits the input focus to be switched, and proceeding to Step 9b if it is permitted, otherwise denying the requirement for switching the input focus;

Step 9b: turning off the secure input switch, saving the identification information, the flag indicating whether to permit the input focus to be switched, and the address and current input position of the input buffer area for the application which loses the input focus, and switch the input focus.

8. The secure input method of claim 7, wherein while switching the input focus, the virtual machine monitor further executes Step 10a: judging whether identification information for an application, which has obtained the input focus, has been saved, and if saved, turning on the secure input switch and storing received input at the current input position in the input buffer area for the application.

* * * * *